United States Patent
Gruenewald et al.

(10) Patent No.: US 10,241,491 B2
(45) Date of Patent: Mar. 26, 2019

(54) INTERFACES FOR CONNECTED SOFTWARE APPLICATIONS IN AUTOMATION ENVIRONMENTS

(71) Applicant: Siemens Aktiengesellschaft, Munich (DE)

(72) Inventors: Thomas Gruenewald, Somerset, NJ (US); Andreas Scholz, Unterschleissheim (DE); Mina Azib, Princeton, NJ (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 422 days.

(21) Appl. No.: 14/740,542

(22) Filed: Jun. 16, 2015

(65) Prior Publication Data
US 2016/0370784 A1    Dec. 22, 2016

(51) Int. Cl.
*G05B 19/05*    (2006.01)
*G06F 9/445*    (2018.01)
*G06F 8/61*    (2018.01)

(52) U.S. Cl.
CPC ....... *G05B 19/056* (2013.01); *G06F 9/44505* (2013.01); *G06F 9/44521* (2013.01); *G05B 2219/13004* (2013.01); *G05B 2219/13109* (2013.01); *G06F 8/61* (2013.01)

(58) Field of Classification Search
None
See application file for complete search history.

(56) References Cited

U.S. PATENT DOCUMENTS

| 7,873,942 | B2* | 1/2011 | Shaburov | G06F 8/34 717/100 |
| 8,171,504 | B1* | 5/2012 | Protassov | G06F 9/4411 710/33 |
| 8,396,969 | B1* | 3/2013 | Schwartz | H04L 29/00 707/999.003 |
| 9,678,719 | B1* | 6/2017 | Frenkel | G06F 8/20 |
| 2003/0131226 | A1* | 7/2003 | Spencer | G06F 8/61 713/100 |
| 2005/0273486 | A1* | 12/2005 | Keith, Jr. | G06F 21/10 709/200 |
| 2007/0201654 | A1 | 8/2007 | Shenfield | |

(Continued)

OTHER PUBLICATIONS

International Search report dated Aug. 2, 2016; International Application No. PCT/US2016/033399; Filing Date: May 20, 2016; 15-pages.

*Primary Examiner* — Tuan C Dao
*Assistant Examiner* — William C Wood (57) ABSTRACT

A method of executing apps on a production device in an automation environment includes storing a plurality of apps in a runtime environment of the production device. A metadata file is stored for each respective app included in the plurality of apps. The metadata file comprises an indication of a network interface that may be used for communication with the respective app by other apps, and an indication of one or more interface dependencies to other network interfaces corresponding to other apps. Prior to executing a particular app on the production device, an operation is performed to verify that each interface dependency associated with the particular app can be fulfilled by the plurality of apps.

14 Claims, 3 Drawing Sheets

(56) References Cited

U.S. PATENT DOCUMENTS

| | | | |
|---|---|---|---|
| 2008/0215673 A1* | 9/2008 | Behrendt | H04L 67/02 709/203 |
| 2012/0192209 A1* | 7/2012 | Ray | G06F 21/121 719/330 |
| 2012/0324483 A1* | 12/2012 | Bello | G06F 9/547 719/330 |
| 2013/0131840 A1* | 5/2013 | Govindaraj | G05B 19/41865 700/19 |
| 2014/0207937 A1* | 7/2014 | Georgiev | H04L 67/02 709/224 |
| 2015/0006328 A1* | 1/2015 | Yoon | G06Q 30/0629 705/26.64 |
| 2015/0016257 A1* | 1/2015 | Kumar | H04L 47/16 370/235 |
| 2015/0334174 A1* | 11/2015 | Mortimer | H04L 67/42 709/203 |

* cited by examiner

INTERFACES FOR CONNECTED SOFTWARE APPLICATIONS IN AUTOMATION ENVIRONMENTS

TECHNICAL FIELD

The present invention relates generally to systems, methods, and apparatuses for connected software applications ("apps") operating in automation environments. The disclosed technology may be applied to, for example, enable and/or enhance the functionality of software apps on production devices such as programmable logic controller and field devices.

BACKGROUND

An "app" is a modular, ready to use software component designed to be run on a particular type of platform. For example, many smart phones, tablet computers, and other mobile devices are configured to run mobile apps in operating systems such as Google's Android and Apple's iOS.

With introduction of powerful programmable logic controllers and other computing devices, there is the potential of extending the app concept to industrial application fields such as plant or factory automation. However, the implementation of apps in such fields faces various challenges. Since consumer apps are typically aimed for individual consumers, they are incomplete in addressing the complexity in manufacturing. Factory automation and manufacturing are significantly more complex than most consumer apps because they require a variety of physical hardware as well as more intimate interactions and complicated workflows.

Additionally, many tasks in an industrial environment are interdependent. Because systems are built in a hierarchal manner with upper layer systems depending on the lower layer systems, physical interactions need to be controlled and coordinated. A major strength of an app-based development model is the great degree of freedom developers have. This leads to high innovation speeds and a broad spectrum of available apps. A standardization heavy approach that defines the kind and structure of interfaces between apps is likely to severely limit these benefits. Especially small sized companies cannot afford the time-consuming and effort intensive standardization work and will most likely chose to not participate in a standardization based app development.

SUMMARY

Embodiments of the present invention address and overcome one or more of the above shortcomings and drawbacks, by providing methods, systems, and apparatuses related to connected software applications ("apps") operating in automation environments. Briefly, in various embodiments described herein, apps may be configured to share capabilities and functionality using interfaces that allow for the creation for detailed workflows.

A method of executing apps on a production device in an automation environment includes storing a plurality of apps in a runtime environment of the production device. A metadata file is stored for each respective app included in the plurality of apps. The metadata file comprises an indication of a network interface that may be used for communication with the respective app by other apps, and an indication of one or more interface dependencies to other network interfaces corresponding to other apps. Prior to executing a particular app on the production device, an operation is performed to verify that each interface dependency associated with the particular app can be fulfilled by the plurality of apps. In some embodiments, the method further includes retrieving the plurality of apps and each corresponding metadata file from an app store.

In some embodiments, the aforementioned method may include additional features. For example, in some embodiments, the method includes identifying a missing interface dependency associated with the particular app. Based on this information, various additional operations may be performed. For example, in one embodiment, the method further includes denying any request to execute the particular app in response to identifying the missing interface dependency. A recommendation for a new app which can fulfill the missing interface dependency may also be provided. In another embodiment, the method further comprises determining that the missing interface dependency is optional and providing a notification to a user interface indicating that functionality associated with the missing interface dependency is unavailable. In another embodiment, a capability request is sent to a capability router for a new app capability of fulfilling the missing interface dependency. In response, an identification of an additional production device in response to the capability request is received. Then, an interface dependency to the additional production device based on the identification may be created.

According to other embodiments described herein, a system for providing a coordinated workflow across a plurality of devices operably coupled via a network in an automation environment includes two production devices and a coordinating device. The first production device is configured to execute a first software app, the first software app corresponding to a first app interface. The second production device is configured to execute a second software app, the second software app corresponding to a second app interface. The coordinating device is configured to execute a third software app which performs the coordinated workflow using the first software app and the second software app.

In some embodiments, the aforementioned system further comprises a capability router. This capability router may be configured to collect capabilities information from the first and second software app. This collection may be performed, for example, using web service APIs which adhere to Representational State Transfer (REST) architectural constraints. Next, when a request is received from the coordinating device for a particular capability, the first software app is identified as providing the particular capability based on the capability information. A response to the request may then be sent with device information corresponding to the first production device. In some embodiments, the coordinating device is configured to execute the capability router.

In some embodiments, the aforementioned coordinating device is further configured to retrieve interface descriptions corresponding to the first and second software from an app store. These interface descriptions may be specified, for example, using the Web Service Definition Language (WSDL). In some embodiments, the coordinating device is also configured to generate an interface program using the interface descriptions. The third software app may then perform the coordinated workflow using this interface program.

According to other embodiments, a system for aggregating app functionality in an automation environment includes a plurality of production devices and a capability router. The production devices operate in the automation environment and each respective production device includes a runtime environment configured to execute one or more apps, store information associated with capabilities of one or more apps, and provide access to the stored information through one or more network interfaces. The capability router is configured to collect information on capabilities of each app available in the automation environment. The router is further configured to receive requests for a requested capability, use the collected information to identify a particular app having the requested capability, and provide an indication of a particular production device executing the particular app in response to the request. In some embodiments, the runtime environment of each respective production device is further configured to enable app functionality through the one or more network interfaces.

The network interfaces used in aforementioned system for aggregating app functionality may include additional enhancements, features, or functionality. For example, in some embodiments, the network interfaces comprise a start interface for starting the particular app on the respective production device, a stop interface for stopping the particular app on the respective production device, a configuration interface for providing configuration to the particular app, a status interface for performing error logging for the particular app, and a data interface for access app data. Additionally, the network interfaces may include a HMI interface providing access to a user interface for the particular app and/or a hardware interface for providing hardware information related to the particular production device. The network interfaces may be provided, for example, using web service APIs which adhere to REST architectural constraint. Each respective interface may be specified by an application developer using an application development kit.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to the use of apps in environments where automation devices are used. The described technology includes three features which may be present in different combinations in different embodiments. First, each app is associated with an interface definition which allows it to communicate with apps and other external resources. This interface definition is uploaded to an app store, along with the app. Then, the interface definition may be used to analyze dependency information in deployments where multiple apps are working together. Secondly, apps may be connected using the interface to create detailed workflows. Connected apps may be used to form a hierarchical system that offers a greater choice of apps due to offerings in marketplace in order to provide optimal customer solution (e.g. different HMIs and optimized controls). Additionally, the modular aspect of apps allows a workflow to be modified dynamically, as needed. Third, a capability router is used in various embodiments to share information regarding the capabilities of each app. This capability information may take the form, for example, of a REST-style network interface that other apps can use to access functionality on a particular app. Using any of these three features, the overall operation of the automation environment may be enhanced through the use of app deployments.

Figure 1:
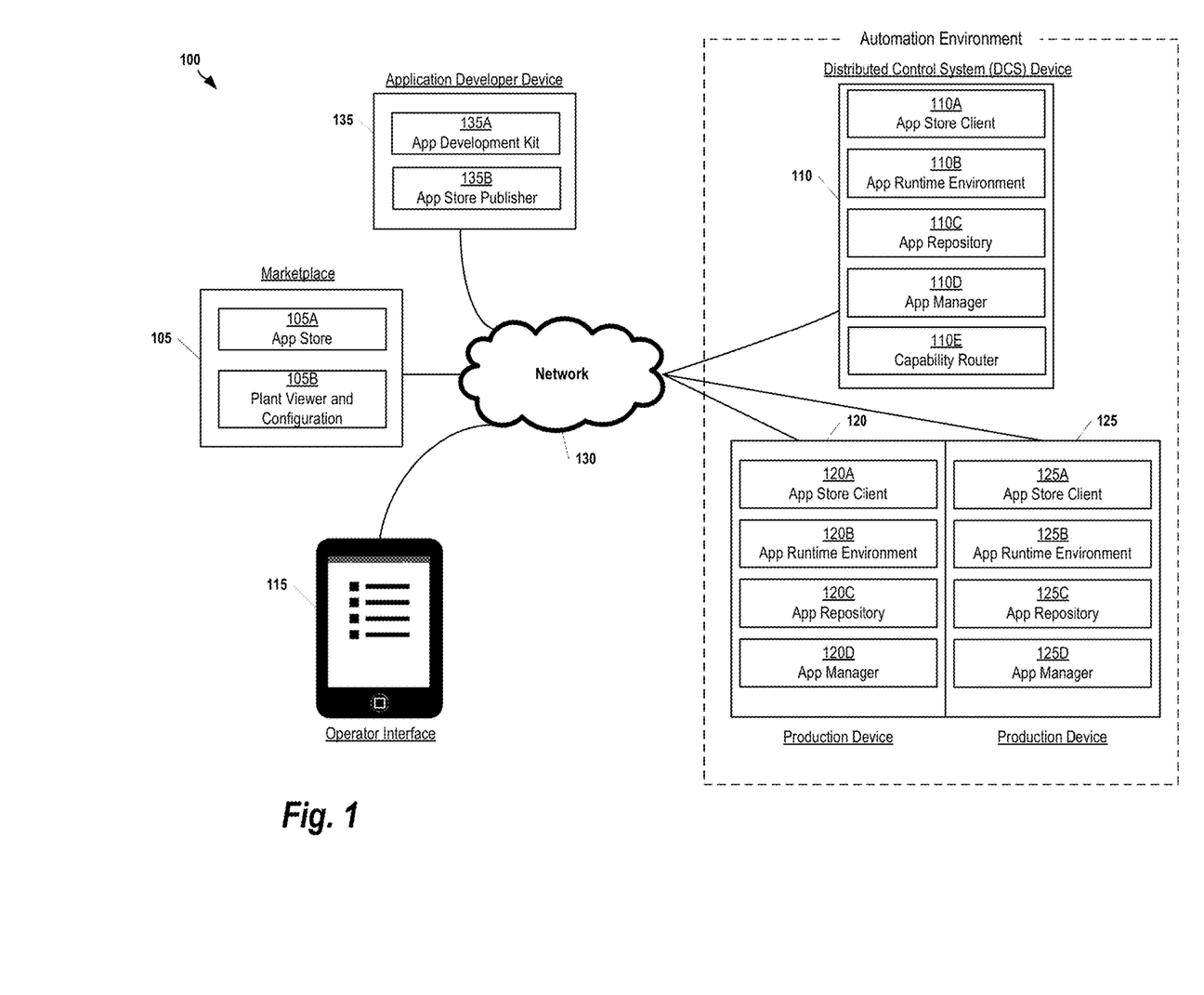
FIG. 1 provides an overview of a system for implementing apps on automation devices which employs user-created interfaces to facilitate interaction between apps, according to some embodiments of the present invention.

FIG. 1 provides an overview of a system 100 for implementing apps on automation devices which employs user-created interfaces to facilitate interaction between apps, according to some embodiments of the present invention. The example of FIG. 1 highlights the use of emergent interfaces for connecting components of the system 100. As described in further detail below, various components are used to share interfaces and track their usage until de-facto standards are observable (which optionally can be documented/standardized after the fact). This reduces the initial standardization burden and allows also small players to define standards if the corresponding apps are successful in the market. The various interfaces connecting each app may be described in a machine readable format known in the art. For example, some embodiments, an XML-based standard such as Web Service Definition Language (WSDL) is used.

The example illustrated in FIG. 1 is divided into five groups of devices: Marketplace Server 105; an Application Developer Device 135; a Distributed Control System Device 110; Production Devices 120, 125; and an Operator Interface 115. These devices 105, 110, 115, 120, 125, and 135 are connected via Network 130. The Network 130 may be implemented using a variety of hardware platforms and communication tools. For example, the Network 130 may be implemented using the IEEE 802.3 (Ethernet) or IEEE 802.11 (wireless) networking technologies, either separately or in combination. In some embodiments, the Network 130 is implemented using the Internet. In other embodiments, for example where security may be a concern, the Network 130 may be a corporate intranet.

Apps are created by application developers on devices such as Application Developer Device 135. An application developer uses an App Development Kit 135A which provides functionality for creating apps executable across a particular set of automation devices (e.g., Devices 110, 120, and 125). Apps may then be published to the App Store 105A using an App Store Publisher component 135B which completes any formal requirements of the App Store 105A and facilitates the process of transferring the app between the Application Developer Device 135 and the Marketplace Server 105

The App Development Kit 135A allows apps to specify an "extension" interface that allows other apps to interact with the app offering the interface. This interface may be specified, for example, in a machine readable format and stored along with the app. This interface will be uploaded together with the app to the App Store 105A when the app is published. In some embodiments, the interface description is executable code. In this case the App Development Kit 135A may download program code that is used to retrieve the interface description, e.g., Java binaries that are inspected via reflection or a library that returns a description as an object in a programming language, etc.

In some embodiments, the App Development Kit 135A further includes an uplink to the App Store 105A that allows the App Development Kit 135A to retrieve interface descriptions from the App Store 105A. The list of returned interfaces can be filtered based on criteria such as, for example, vendor, name, application field, date, or quality. The actual apps providing these interfaces do not have to be fetched for necessarily, but can be fetched if the implementer decides this is beneficial. In some embodiments, the App Development Kit 135A tracks the usage of interfaces. Whenever the application developer decides to use the interface of another app, this dependency is tracked by the App Development Kit 135A. These dependencies may be stored along with the app (e.g., in a metadata file) and also uploaded to the App Store 105A when the app is published. Optionally, the interface descriptions retrieved from the App Store 105A can also be used to generate program code that simplifies the interaction with the interfaced apps.

Continuing with reference to FIG. 1, the Marketplace Server 105 includes an App Store 105A that makes apps available to Devices 110, 120, 125 (e.g., via download). In some embodiments, the App Store 105A includes a web-based store interface where users can browse through different categories of apps, view descriptive information about each app, and acquire the app. Additionally, the App Store 105A is extended with a component that stores interface descriptions for apps and allows the searching and downloading of these descriptions by the App Development Kit 135A. In some embodiments, the App Store 105A can provide a dependency checker as described in the next section to allow users to filter apps based on dependencies. For example, the App Store 105A may only show apps when all dependencies are fulfilled or recommend apps to the user when dependencies are not fulfilled. The App Store 105A may also provide information such as reviews or ratings with each app. In one embodiment, the App Store 105A also handles any financial transactions associated with acquiring the app. For example, an application developer may set a price for each app uploaded to the App Store 105A. Upon a purchase of one of the application developer's applications, the App Store 105A will send the funds to the application developer. A portion of the funds representing commission fees due to the App Store 105A may be automatically deducted by App Store 105A prior to transmission to the application developer.

The Marketplace Server 105 also includes a Plant Viewer and Configuration Component 105B which allows navigation through devices installed at a particular location. This Component 105B may provide information such as, the particular apps which are installed and running at the location, as well as their hardware and software capabilities.

Figure 3:
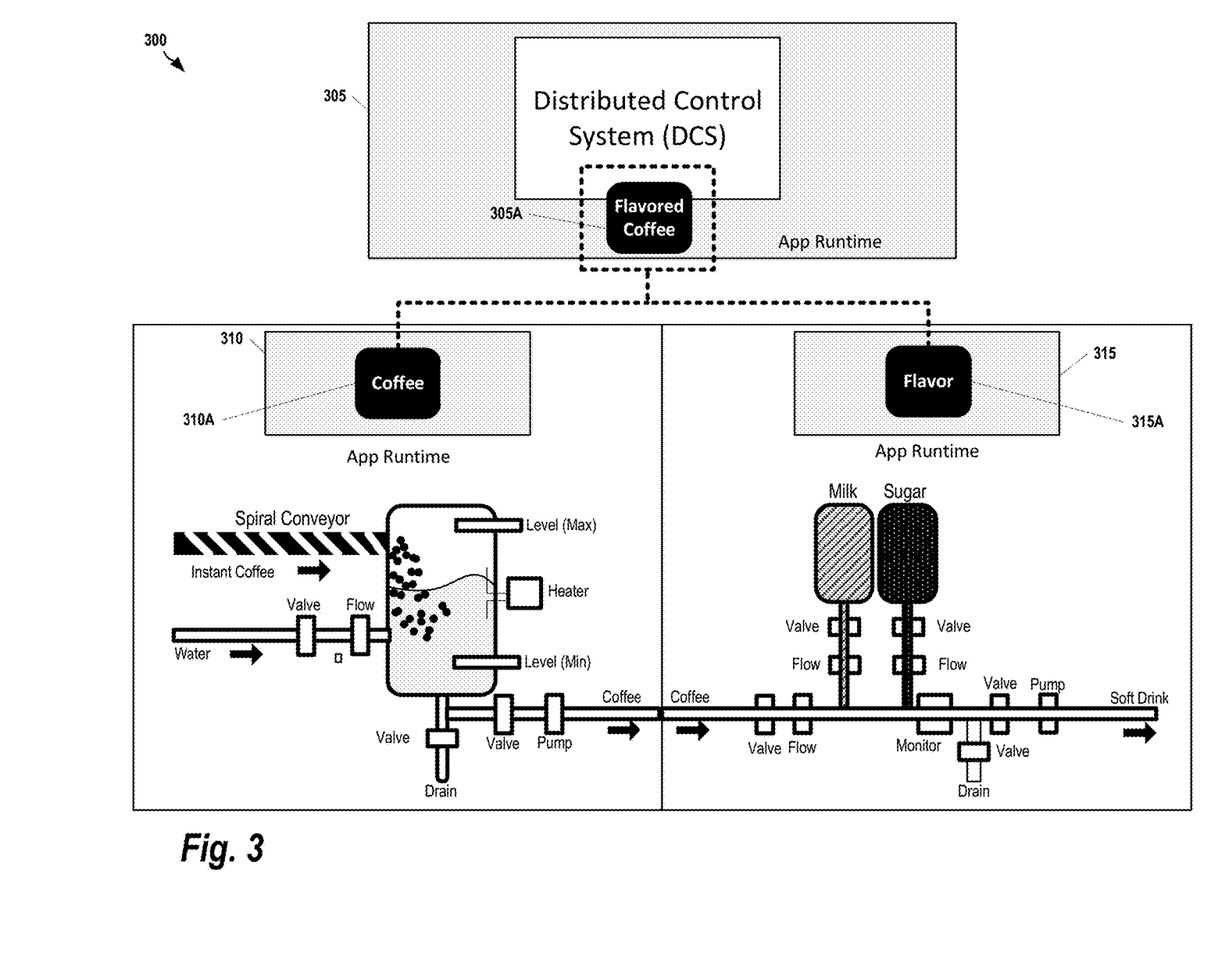
FIG. 3 provides an example of connected apps, implemented using some techniques described herein in various embodiments.

A Distributed Control System (DCS) Device 110 and two Production Devices 120, 125 operating in an automation plant are connected to the Network 130. The DCS Device 110 controls a process divided into modules executed by the Production Devices 120, 125. For example, as illustrated in FIG. 3, the DCS Device 110 may control two production devices which control coffee brewing and favoring, respectively. Each Production Devices 120, 125 may be a programmable logic controller, field device, or similar device with a processor and other hardware capabilities which allow execution of the technology described herein. Each of these devices 110, 120, 125 includes the same basic components for executing app functionality. Thus, each component includes an App Store Client (110A, 120A, 125A), an App Runtime Environment (110B, 120B, 125B), an App Repository (110C, 120C, 125C), and an App Manager (110D, 120D, and 125D). For brevity, the functionality of these components will be described with reference to the DCS device. However, it should be understood that this description likewise applies to the corresponding components of the Production Devices 120, 125.

An App Store Client 110A operating on the DCS Device 110 communicates with an App Store 105A to download apps to the DCS Device 110. The downloaded apps may include new apps not previously installed on the DCS Device 110, as well as updates to apps previously installed on the DCS Device 110. The communication between the App Store Client 110A and the App Store 105A may be triggered automatically or based on some user input. In addition to the executable app, the App Store Client 110A may also download metadata information associated with a particular app, including a dependency list referencing other apps required for execution.

An App Runtime Environment 110B on the DCS Device 110 facilitates the execution of one or more apps retrieved from the App Store 105A. Apps in the App Runtime Environment 110B can send instructions to a device processor (not shown in FIG. 1) of the DCS Device 125 and access system resources of the DCS Device 125 via an App Runtime Application Program Interface (API). An App Manager 125 manages the apps which are installed on the DCS Device 125 and how they operate. For example, in some embodiments, the App Manager 110D may be responsible for tasks such as managing resource usage among apps executing in the App Runtime Environment 110B, moving apps in and out of the App Runtime Environment 110B, maintaining records of which apps are installed on the DCS Device 110 (including the respective version of each app), and creating backup copies of the apps in an App Repository 110C, when necessary.

In some embodiments, the App Runtime Environment 110B is extended with a component that checks whether dependencies are fulfilled before an app is executed. The App Runtime Environment 110B uses the dependency list stored along with the downloaded app to check whether all the noted dependencies are available. For example, in some embodiments, the App Runtime Environment checks whether all interfaces required by the new app can be provided by apps already present on the device. If the dependencies cannot be fulfilled, the app will not be executed. In some embodiments, interfaces can be marked as "optional". If an optional interface is missing, the app will be started nevertheless. The interface is, in this case, replaced with a dummy implementation or the app is notified that the interface is not available.

In some embodiments, an app aggregation technique is used where the App Runtime Environment 110B builds up functionality from not only locally available apps but from remote or distributed apps. The App Runtime Environment 110B may route interactions to and from the remote nodes that contain the apps. This routing may be done transparently for an app which can be programmed as if all interfaces are available locally. If latency is of critical importance, interfaces can be marked as "local only" to prevent remote access.

The App Repository 110C provides long-term storage for apps (and related metadata information) in non-volatile memory (or another computer readable medium) on the DCS Device 110. In some embodiments the App Repository 110C is a partition of long-term storage on the DCS Device 110. In other embodiments, the App Repository 110C is located on a removable storage device such as, for example, a micro USB card inserted into a slot (not shown in FIG. 1) in DCS Device 110. Additionally, in some embodiments, the App Manager 110D creates backup copies of the App Repository 110C, either locally or on remote (e.g., cloud-based) storage. The backup process may be automated (e.g., at regular intervals or following certain events such as installation of a new app) or it may be triggered explicitly by the user.

The DCS Device 110 in this example includes one component not found on the production device: the Capability Router 110E. The Capability Router 110E provides the ability to share, in a distributed manner, the functional capabilities of the various devices 110, 120, and 125 in the automation environment. In turn, this allows a "connected apps" architecture to be implemented wherein apps share capabilities with one another in order to perform operations. The Capability Router 110E is configured to respond to requests received from other devices for information about the capabilities of apps running on the devices 110, 120, 125. Similarly, apps running the DCS Device 110 can use the Capability Router 110E to generate and send requests for information about the capabilities of apps running on the other devices 120 and 125. Additionally, in some embodiments, the Capability Router 110E periodically sends out requests to other devices operating the automation environment to collect information on capabilities. This collected information may then be used to process capability requests from apps by identifying which device in the environment has the capabilities of accommodating the request.

In some embodiments, one or more networking protocols generally known in the art may be used to share host address information corresponding to each device. For example, in some embodiments, tables are exchanged by devices indicative of connected devices. Based on the host address information, the Capability Router 110E can gather information using REST-style HTTP requests. For example, in some embodiments, the base URL that is accessed for interaction of apps is defined as "RUNTIME_APP URL=http://<runtime_host>/service/app/," where "runtime_host" is the device that the Capability Router 110E is attempting to query. Then, using this base URL, various interfaces may be accessed by appending specific requests. The table below illustrates some examples of the types of requests that may be provided in some embodiments:

| REST Interface | Functionality |
| --- | --- |
| RUNTIME_APP URL/start | Starts the app on the host |
| RUNTIME_APP URL/stop | Stops the app on the host |
| RUNTIME_APP URL/hmi | User interface to the app if it exists |
| RUNTIME_APP URL/conf | Configuration required for the specific app |
| RUNTIME_APP URL/status | Error/Logging of app operation |
| RUNTIME_APP URL/data | Any data that the app wants to expose to the user |

In other embodiments, other base URLS may be utilized to provide access to additional information on the device. For example, in some embodiments, the URL "RUNTIME_HW_PROFILE=http://<runtime host>/service/hw profile" may be used to access specifics of the hardware for this device. In other embodiments, the base URL "RUNTIME_CAPABILITIES_URL=http:/<runtime host>/service/capabilities" is used to access the capabilities that are available on the device.

Although the Capability Router functionality has been described above as being located on the DCS device 110, in other embodiments, the functionality is centralized at a different location accessible to all the devices operating in the automation environment. For example, the functionality may be centralized within the Marketplace Server 105 or on a server within the automation environment. Then, the App Runtime Environment of each device may be modified to generate and respond to requests for capability information, for example using the REST-style URLS generally described above.

The Operator Interface 115 may be used to manage apps in the automation environment. Although the Operator Interface 115 is shown outside the automation environment in FIG. 1, in other embodiments, it may be used local to that environment and connect directly with devices, for example, using Bluetooth or a similar networking protocol. The Operator Interface 115 may be used, for example, to view the current workflow of the app, change configurations, view any dependency issues, and install apps. It should be noted that, although a tablet computer is shown as the Operator Interface 115 in FIG. 1, any computing device generally known in the art and offering similar functionality may likewise be employed as the interface.

Figure 2:
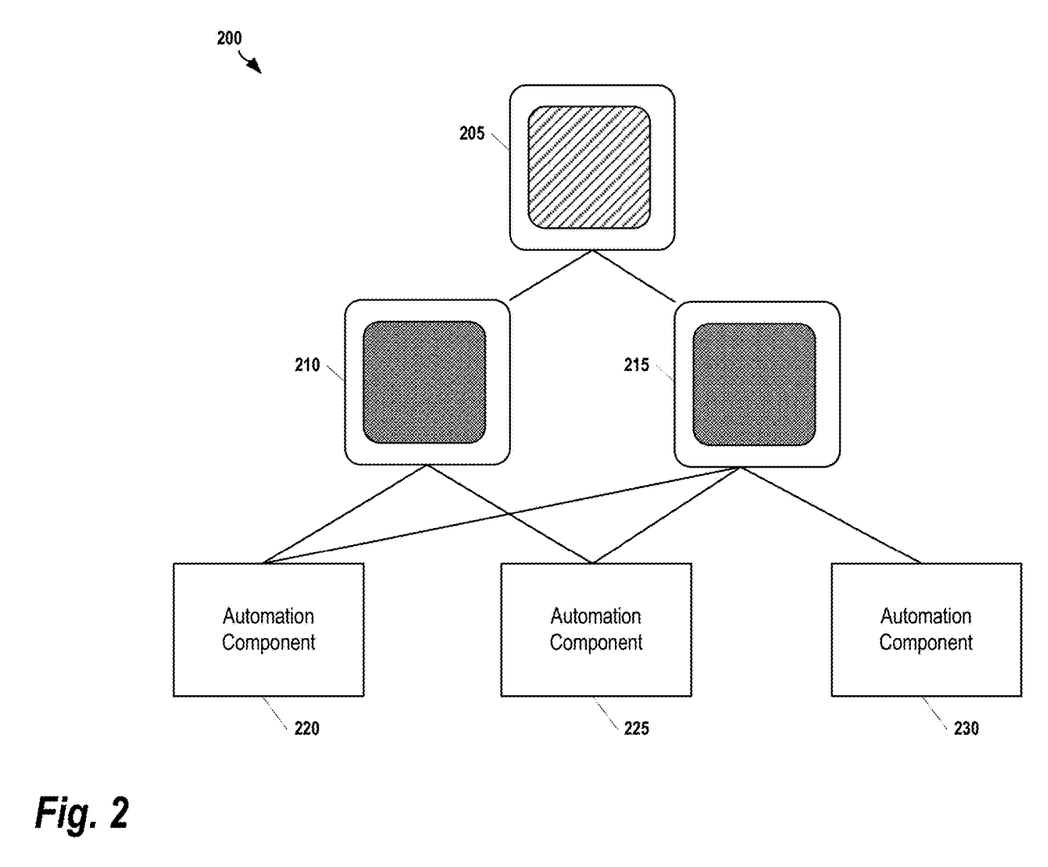
FIG. 2 illustrates the concept of connected apps, as it may be implemented in some embodiments.

FIG. 2 provides an illustration 200 of the concept of connected apps, as it may be implemented in some embodiments. App 205 is connecting to Apps 210 and 215 which are executed across a group of Automation Components 220, 225, 230. Using this connection, the Apps 205, 210, and 215 may perform operations such as coordinating workflows, offering different HMIs for different stakeholders, etc. The concept of connected apps allows utilization of other apps via interfaces (e.g., a REST interface). The assumption is that apps will offer (control) interfaces to trigger certain actions, and/or execute a certain function or monitor certain values. The interfaces may be described through an interface description language which allows other apps to access the interface to be interpreted and used. One advantage of connected apps is that it allows building up hierarchical systems easily while keeping separation of concerns. Another advantage is that, through the connected apps concept, the software can be deployed and/or exchanged easily FIG. 3 provides a system diagram 300 showing an example of connected apps, implemented using some techniques described herein in various embodiments. The apps 310A, 315A (coffee brewing and coffee flavoring, respectively) in the production modules 310 and 315 provide interfaces (APIs) to perform certain operations (e.g., liquid intake, granule intake amount, brewing time, brewing temperature, fill tank level, tank temperature, etc.). The workflow app 305A shown in App Runtime of the DCS 305 uses these interfaces to perform a more holistic operation and is coordinating the workflow. This workflow app 305A is connecting to both production modules 310, 315 to produce and flavor drinks. For example, in some embodiments, the workflow app 305A may offer built-in HMI where an operator can order certain recipes and certain amounts of coffee.

Using the concept of connectivity, in some embodiments, the functionality of various apps may be aggregated across devices to provide extended functionality. App Aggregation with automation apps differ from the current state of consumer apps. Consumer (i.e., no automation) apps are able to interact though the operating system on the same device. Interacting exclusively on the same device is not sufficient for automation and manufacturing since there are many heterogeneous devices that need to work together. App Aggregation may be accomplished using the Capability Router (see FIG. 1) to find the capabilities that can be used in a particular app. For example an app may request a capability with a certain standard of configuration parameters. The app has the business logic that dictates the values for the configuration for this capability. The app then can access the functionality of the other apps as needed for a predefined interface or API, access, and monitor the other app. Once this app is published and downloaded to a device, it becomes a software capability and is added to the Capability Router, so that it can be consumed by other apps as well. Since there is a standard interface, this allows apps to have a uniform way of interacting in a distributed and heterogeneous environment.

The programmable logic controllers described herein are one example of a control layer device used in industrial automation environments. A programmable logic controller is typically configured to execute software which continuously gathers data on the state of input devices to control the state of output devices. A programmable logic controller typically includes three major components: a processor (which includes volatile memory), non-volatile memory comprising an application program, and one or more network components (e.g., input/output ports) for connecting to other devices in the automation system.

The processors described herein as used by computing devices (including, without limitation, programmable logic controllers) may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation, production devices and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f), unless the element is expressly recited using the phrase "means for."

We claim:
1. A method of executing apps on a production device in an automation environment, the method comprising:
   storing a plurality of apps in a runtime environment of the production device,
   for each respective app included in the plurality of apps, storing a metadata file comprising:
      an indication of a network interface used for communication with the respective app by other apps, and an indication of one or more interface dependencies to other network interfaces corresponding to other apps; and prior to executing a particular app on the production device, verifying that the plurality of apps can fulfill each interface dependency associated with the particular app;

identifying a missing interface dependency associated with the particular app, wherein the missing interface dependency indicates an interface to missing functionality required by the particular app but not available by any of the plurality of apps stored on the production device;

sending a request for a new app capable of fulfilling the missing interface dependency;

receiving an identification of a remote production device in response to the request, wherein a new app on the remote production device provides the functionality via the interface;

creating a new interface dependency for accessing the new app on the remote production device based on the identification; and during execution of the particular app on the production device routing requests for the missing functionality required by the particular app from the runtime environment of the production device to the remote production device.

2. The method of claim 1, further comprising:
denying any request to execute the particular app in response to identifying the missing interface dependency until the new interface dependency is created.

3. The method of claim 2, further comprising:
providing a recommendation for the new app which can fulfill the missing interface dependency.

4. The method of claim 1, further comprising:
identifying an additional missing interface dependency associated with the particular app;
determining that the additional missing interface dependency is optional; and
providing a notification to a user interface that functionality associated with the additional missing interface dependency is unavailable.

5. The method of claim 1, further comprising:
retrieving the plurality of apps and each corresponding metadata file from an app store.

6. A system for aggregating app functionality in an automation environment, the system comprising:
a plurality of production devices operating in the automation environment, each respective production device comprising a runtime environment configured to:
execute one or more apps,
store information associated with capabilities of one or more apps, and
provide access to the stored information through one or more network interfaces; and
a capability router configured to:
collect information on capabilities of each app available in the automation environment,
receive a request for a requested capability from a requesting production device;
use the collected information to identify a particular app having the requested capability, and
respond to the request with a network interface that allows the coordinating device to directly access the particular app on a particular production device,
provide an indication of a particular production device executing the particular app to the requesting production device in response to the request,
wherein the requesting production device uses the network interface to fulfill an interface dependency for directly communicating with the particular production device to perform the requested functional capability during execution of an app by the requesting production device.

7. The system of claim 6, wherein the runtime environment of each respective production device is further configured to:
enable app functionality through the one or more network interfaces.

8. The system of claim 7, wherein the one or more network interfaces comprise at least one of the following:
a start interface for starting the particular app on the respective production device,
a stop interface for stopping the particular app on the respective production device,
a configuration interface for providing configuration to the particular app,
a status interface for performing error logging for the particular app, or
a data interface for accessing app data.

9. The system of claim 8, wherein the one or more network interfaces further comprise:
a HMI interface providing access to a user interface for the particular app.

10. The system of claim 6, wherein the one or more network interfaces comprise:
a hardware interface for providing hardware information related to the particular production device.

11. The system of claim 6, wherein the one or more network interfaces are provided using web service APIs which adhere to Representational State Transfer (REST) architectural constraints.

12. The system of claim 6, further comprising an application development kit configured to track usage and interdependency of network interfaces, and enable each app to specify an extension interface for interacting with other apps.

13. The system of claim 6, wherein the respective production devices in the automation environment are heterogeneous.

14. The system of claim 1, wherein the capability router is configured to:
execute a workflow app that connects to a first app and to a second app, wherein the first app and the second app are executed across a plurality of automation components, and the workflow app coordinates a workflow for the plurality of automation components.

* * * * *